United States Patent [19]
McMahon

[11] 3,870,287
[45] Mar. 11, 1975

[54] GAS SPRING

[76] Inventor: John McMahon, 57 Leacliff Ln., West Seneca, N.Y. 14224

[22] Filed: Dec. 26, 1973

[21] Appl. No.: 428,089

[52] U.S. Cl............................. 267/113, 267/65 R
[51] Int. Cl.............................................. F16f 9/00
[58] Field of Search........... 267/113, 124, 129, 65 R

[56] References Cited
UNITED STATES PATENTS

| 3,188,072 | 6/1965 | Wustenhagen et al. | 267/124 |
| 3,281,138 | 10/1966 | Oster | 267/124 |
| 3,741,559 | 6/1973 | Ross | 267/124 |

*Primary Examiner*—James B. Marbert

[57] ABSTRACT

Gas springs, in which a piston operates within a cylinder containing a pressurized gas, are commonly used as door closers, tensioning devices, counterbalances, and other applications. Known gas springs operate such that the piston rod extends outwardly from the cylinder (push-type). An improved gas spring is provided in which a second piston rod, of different diameter from the first piston rod, is rigidly fixed to the piston and to the first piston rod. This provides a pull-type or retracting feature, as well as the push-type operation. Pull-type operation is more efficient in a number of applications previously accomplished with push-type devices. In one embodiment a detachable rigid hollow cover member is provided to be attachable to either end of the cylinder through which the piston rods extend.

9 Claims, 4 Drawing Figures

GAS SPRING

BACKGROUND OF THE INVENTION

Gas springs are used for a variety of purposes including, for example, door closers, tensioning devices, counterbalances, seat supports, seat adjustment springs and in lieu of common springs.

A gas spring consists basically of a piston operating within a cylinder or chamber which is pressurized with a gas such as nitrogen. Typically, the chamber is pressurized to five or more atmospheres. The piston contains an orifice so that the pressure on each face of the piston is equal. However, since the piston rod reduces the area on which the pressure can act on one side of the piston, there is a net force tending to extend the piston rod outwardly from the chamber. This motion of the piston rod, which is a push-type motion, can be made to do work of the type accomplished by ordinary mechanical compression springs.

Gas springs are superior, however, in a number of respects to mechanical compression springs. For example, the force output of a gas spring is almost constant and linear over a large travel or extension. This is not the case with a mechanical compression spring. Further, gas springs, unlike mechanical compression springs, are capable of generating relatively large forces over extended travel within relatively small spaces. Gas springs are normally not subject to metal fatigue type failures, as are mechanical compression springs. Gas springs are more flexible since they can be made to lock in any given position by merely stopping the flow of gas through the piston orifice and since damping, resilience and speed of operation can be controlled by proper selection or adjustment of the piston orifice.

Despite the advantages, previously known springs do have some limitations. One limitation is that the force on the piston which extends the piston rod outwardly from the chamber providing push-type operation is similar to the operation of a mechanical extension spring. In some applications it would be desirable to have a piston rod which would, in operation, retract into the chamber.

Another limitation of conventional gas springs is that as the piston and piston rod move outwardly from the chamber in operation, the two support points between the piston rod and the chamber and between the piston and the chamber move closer together. Accordingly as these support points get closer together, the loads at these points become increasingly greater for any given side load. The forces created by these side loads can become excessive, thereby causing scoring of the chamber and possible damage to the seals. Damage to the seals will, of course, result in leakage of the pressurizing gas and render the device less efficient than designed or, if sufficient leakage has taken place, completely useless.

SUMMARY OF THE INVENTION

It is an object of this invention to provide an improved gas spring which has a piston rod which, in operation, retracts into its chamber.

It is another object of this invention to provide an improved gas spring equipped with two piston rods, one of which, in operation, extends outwardly from its chamber (push-type operation), the other of which, in operation, retracts into its chamber (pull-type operation), thereby providing dual acting type operation.

Still another object of the invention is to provide an improved gas spring in which the piston and piston rods are suppported at fixed points, regardless of the position of the piston within the chamber, thereby resulting in improved resistance to damage by side loads.

Other objects and advantages of the invention will be apparent from the following description.

The objects of the invention are accomplished by providing an improved gas spring comprising a gas loaded chamber defined by a rigid wall, and opposite end walls each having a bore therethrough, but of different diameters. A piston is slideably mounted within said chamber. A first piston rod is rigidly fixed to the piston and is extendible through the bore of one end wall. A first seal is mounted within the bore of the end wall which cooperates with the first piston rod to prevent escape of gas from the chamber. A second piston rod, of different diameter than the first piston rod is rigidly fixed to the piston and is extendible through the bore of the other end wall. A second seal is mounted within the bore of the other end wall which cooperates with the second piston rod to prevent escape of gas from the chamber.

A detachable hollow cover member may be attached to either end of the chamber through which the piston rods extend thereby providing additional chambers into which the piston rods may extend in operation.

DETAILED DESCRIPTION OF THE INVENTION AND OF THE PREFERRED EMBODIMENTS

Figure 1:
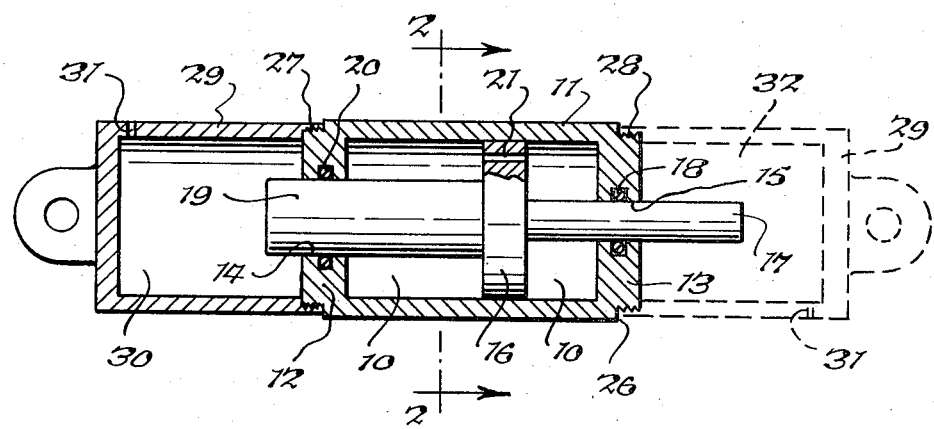
FIG. 1 is a vertical longitudinal cross section of the preferred embodiment of the invention.
Figure 2:
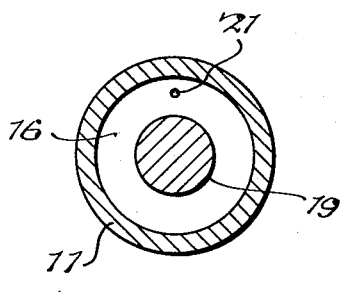
FIG. 2 is a vertical section taken through 2—2 of FIG. 1.

With reference to FIGS. 1 and 2, an improved gas spring in accordance with the invention has a chamber 10 defined by a rigid wall 11 and opposite end walls 12 and 13 having bores 14 and 15, respectively, therethrough, said bores being of different diameters.

Figure 3:
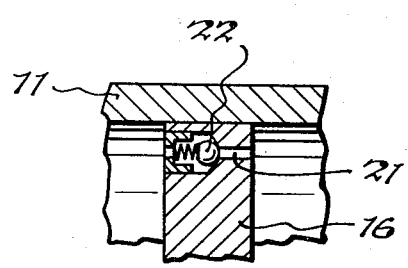
FIG. 3 is a fragmentary, enlarged section similar to that portion of the orifice shown in FIG. 1, said orifice being shown with a check valve.
Figure 4:
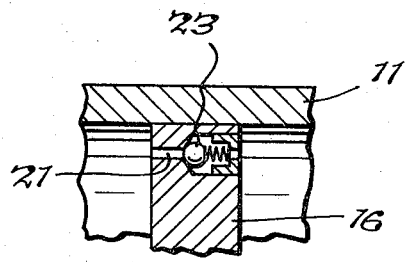
FIG. 4 is a view similar to that of FIG. 3, with the check valve shown in the opposite direction to check the flow of gas in the opposite direction to the direction to that checked in FIG. 2.

A piston 16 is slideably mounted within chamber 10. A first piston rod 17 is rigidly fixed to piston 16 and is extendible through bore 15 of end wall 13. A first seal 18, such as an "O" ring seal, is mounted within bore 15 and cooperates with first piston rod 17 to prevent escape of gas from chamber 10 when the chamber is charged. A second piston rod 19, of different diameter than first piston rod 17, is rigidly fixed to piston 16 and is extendible through bore 14 of end wall 12. As will be apparent to anyone skilled in the art, the disclosed combination of a first and second piston rod, of different diameters, rigidly fixed to a piston, may be engineered as a single stepped shaft. A second seal 20, such as an "O" ring seal, is mounted within bore 14 of end wall 12 and cooperates with second piston rod 19 to prevent escape of gas from chamber 10 when the chamber is charged. One or more orifices such as orifice 21 is provided in piston 16 to permit flow of gas therethrough. FIGS. 3 and 4 show check valves 22 or 23 in orifice 21 which control damping in one or the other directions of travel of the piston, or, if desired, provide a means of locking the spring at a given position. Alternatively, piston 16 can be designed of sufficiently smaller diameter then the diameter of chamber 10, so as to inherently control the degree of damping.

In a typical operation, section 24 of chamber 10 is charged with a gas, i.e. a relatively compressible elastic fluid, such as air or dry nitrogen to a pressure above atmospheric. This gas pressure acts to drive piston rod 17 to retract into chamber 10. As can be seen, this provides a pull-type operation.

It can be seen that first piston rod 17 and second piston rod 19 are supported at fixed points 25 and 26, regardless of the position of piston 16. As a result, piston 16 need never come into metal to metal contact with wall 11 of chamber 10. Optionally, a seal may be used around piston 16 and wall 11 of the chamber. The support provided at fixed points 25 and 26 results in a substantial capability of the improved gas springs of the invention to absorb the forces of side loads, during use, without damage. This, in turn, results in a long and reliable operation of these improved gas springs.

Means, such as threading 27 and 28 are provided on the outer circumferences of end walls 12 and 13, for the attachment of detachable rigid hollow cover member 29. When cover member 29 is attached to end wall 12, a cavity 30 is provided into which piston rod 19 moves in operation. Cavity 30 affords protection for piston rod 19 against environmental damage. The movement of piston rod 19 into cavity 30 displaces gas from cavity 30 which is vented to the atmosphere through one or more orifices, such as orifice 31. Optionally, and not shown in the drawings, a check valve, or other adjustable orifice, may be provided in such orifice or orifices to afford auxiliary damping, if desired, during movement of piston rod 19.

It is a feature of the invention that cover member 29 can be detached from end wall 12 and attached, instead to end wall 13. In the latter case, piston rod 17 extends into the then former cavity 32 and the gas spring becomes an extending or push-type gas spring in which case the reliability features of the improved gas spring are retained.

Cover member 29 may be designed in a size and shape compatible with the volume and damping requirements of a given application.

The improved gas springs may be used in all those applications for which conventional gas springs have previously been employed including door closers, tensioning devices for cables, hoses and the like, counterbalances for gimballed or pivoted systems, seat supports in vehicles, such as snowmobiles, tractors and other rough terrain vehicles, seat adjustment springs, such as in automobiles, replacements for mechanical compression springs, spring applications which require a relatively constant force output over a long travel, spring applications which also require damping, pantograph counterbalance springs, such as are used in adjustable position tables and movable sighting devices, and linear counterbalances as replacements for mass weights such as for vertically moving parts of machines and for station wagon tailgates, or the windows thereof. Although all of the above described applications may be made with a push-type device, some of them, namely door closers, tensioning devices and pantograph counterbalances are more efficiently made with a pull-type device.

It will be readily understood by persons of ordinary skill in the art from the foregoing description that modifications and variations of the invention can be made within departing from the spirit thereof. Accordingly, it is intended that the scope of the invention be limited only by a reasonable interpretation of the appended claims.

I claim:
1. An improved gas spring comprising:
   a. a gas loaded chamber defined by a rigid wall, and
   b. opposite end walls each having a bore therethrough, but of different diameters,
   c. a piston slideably mounted within said chamber,
   d. a first piston rod rigidly fixed to the piston, extendible through the bore of one end wall,
   e. a first seal mounted within the bore of said end wall and cooperating with the first piston rod to prevent escape of gas from the chamber,
   f. a second piston rod, of different diameter than the first piston rod, rigidly fixed to the piston, extendible through the bore of the other end wall, and
   g. a second seal mounted within the bore of said other end wall and cooperating with the second piston rod to prevent escape of gas from the chamber.

2. An improved gas spring according to claim 1 in which the piston is provided with one or more orifices to permit the passage of gas therethrough, thereby providing a damping effect.

3. An improved gas spring according to claim 1 in which means are provided to attach a rigid hollow cover member on either end of the chamber, thereby providing an additional chamber into which the first or second piston rods may extend in operation.

4. An improved gas spring according to claim 1 incorporating a rigid hollow cover member attached to the end of the chamber, through which the first piston rod extends, thereby providing an additional chamber into which the first piston rod may extend in operation.

5. An improved gas spring according to claim 4 in which the rigid hollow cover member is detachable and is adapted to be attached to the end of the chamber through which the second piston rod extends, thereby providing an additional chamber into which the second piston rod may extend in operation.

6. An improved gas spring according to claim 1 incorporating a rigid hollow cover member attached to the end of the chamber through which the second piston rod extends, thereby providing an additional chamber into which the second piston rod may extend in operation.

7. An improved gas spring according to claim 6 in which the rigid hollow cover member is detachable, and is adapted to be attached to the end of the chamber through which the first piston rod extends, thereby providing an additional chamber into which the first piston rod may extend in operation.

8. An improved gas spring according to claim 4 in which the rigid hollow cover member is provided with one or more orifices to permit the passage of gas therethrough and thereby provide a damping effect when the cover member is attached.

9. An improved gas spring according to claim 6 in which the rigid hollow cover member is provided with one or more orifices to permit the passage of gas therethough and thereby provide a damping effect when the cover member is attached.

* * * * *